(12) United States Patent
Long et al.

(10) Patent No.: US 12,253,191 B2
(45) Date of Patent: Mar. 18, 2025

(54) PIPELINE ASSEMBLY AND AIR CONDITIONING SYSTEM

(71) Applicants: GD MIDEA HEATING & VENTILATING EQUIPMENT CO., LTD., Foshan (CN); HEFEI MIDEA HEATING & VENTILATING EQUIPMENT CO., LTD., Hefei (CN)

(72) Inventors: Danfeng Long, Foshan (CN); Yandong Wu, Foshan (CN); Tiegang Zhang, Foshan (CN); Min Zhong, Foshan (CN)

(73) Assignees: GD MIDEA HEATING & VENTILATING EQUIPMENT CO., LTD., Foshan (CN); HEFEI MIDEA HEATING & VENTILATING EQUIPMENT CO., LTD., Hefei (CN)

( * ) Notice: Subject to any disclaimer, the term of this patent is extended or adjusted under 35 U.S.C. 154(b) by 0 days.

(21) Appl. No.: 18/555,244

(22) PCT Filed: Dec. 10, 2021

(86) PCT No.: PCT/CN2021/137189
§ 371 (c)(1),
(2) Date: Oct. 12, 2023

(87) PCT Pub. No.: WO2022/237152
PCT Pub. Date: Nov. 17, 2022

(65) Prior Publication Data
US 2024/0200696 A1     Jun. 20, 2024

(30) Foreign Application Priority Data
May 14, 2021  (CN) .......................... 202121047547.9

(51) Int. Cl.
*F16L 13/02* (2006.01)
*F16L 13/007* (2006.01)
*F25B 41/40* (2021.01)

(52) U.S. Cl.
CPC ............. *F16L 13/02* (2013.01); *F16L 13/007* (2013.01); *F25B 41/40* (2021.01)

(58) Field of Classification Search
CPC ... F16L 13/02; F16L 13/0209; F16L 13/0218; F16L 13/007; F16L 25/14; F25B 41/40
See application file for complete search history.

(56) References Cited

U.S. PATENT DOCUMENTS 12,049,966 B2 *   7/2024  Hamadate ............. F16L 13/007
12,055,328 B2 *   8/2024  Hamadate ............. F16L 13/007
(Continued)

FOREIGN PATENT DOCUMENTS

CN    205781506 U    12/2016
CN    109570791 A     4/2019
(Continued)

OTHER PUBLICATIONS

CN-110043721-A—Machine Translation—English (Year: 2019).*
ISR Received in PCT/CN2021/137189; mailed Mar. 1, 2022.

*Primary Examiner* — William S. Choi

(57) ABSTRACT

A pipeline assembly and an air conditioning system. The pipeline assembly includes a first steel pipe, a second steel pipe, a first copper sleeve and a second copper sleeve, wherein the first copper sleeve is fixed at an end of the first steel pipe, and the first copper sleeve includes a first section sleeved on the periphery of the first steel pipe and a second section extending beyond the end of the first steel pipe; the second copper sleeve is fixed at an end of the second steel pipe, and the second copper sleeve is sleeved on the peripheral side of the second steel pipe; and the second section and (Continued)

at least part of the second copper sleeve are sleeved with and welded to each other.

17 Claims, 3 Drawing Sheets

(56) References Cited

U.S. PATENT DOCUMENTS

2005/0005983  A1    1/2005  Lewis
2007/0157454  A1*  7/2007  Keefer ................ F16L 13/0209

FOREIGN PATENT DOCUMENTS

| CN | 110043721 | A | * | 7/2019 |
| CN | 112178308 | A | | 1/2021 |
| CN | 213809293 | U | | 7/2021 |
| CN | 215410630 | U | | 1/2022 |

* cited by examiner

PIPELINE ASSEMBLY AND AIR CONDITIONING SYSTEM

CROSS-REFERENCES TO RELATED APPLICATIONS

The present disclosure is a national phase application of International Application No. PCT/CN2021/137189, filed on Dec. 10, 2021, which claims priority to Chinese Patent Application No. 202121047547.9, filed on May 14, 2021, the entireties of which are herein incorporated by reference.

FIELD

The present disclosure relates to the technology field of air conditioner, and to a pipeline assembly and an air conditioning system.

BACKGROUND

The refrigerant pipe of an air conditioner is usually copper sleeves, among which a phosphorus-copper brazing filler metal with good fluidity, low price and excellent technological performance is widely used for welding. In order to reduce the material cost and enhance the structural strength of the refrigerant pipe of the air conditioner, and reduce the heat loss of the refrigerant, it is proposed in the related art for using a steel pipe as the refrigerant pipe in the air conditioner. However, the welding of steel pipes needs silver-containing solder, which is of high cost and thus not suitable for commercial use. Besides, the welding equipment and welding process in the related art are both designed based on the copper pipe, and the steel pipe has poor adaptability to the existing welding equipment and welding process.

SUMMARY

The present disclosure aims to solve at least one of the problems existing in the related art.

For this, embodiments of the present disclosure provide a pipeline assembly with low cost and high adaptability to the existing welding equipment and welding process.

Embodiments of the present disclosure further provide an air conditioning system with the pipeline assembly as described above.

According to embodiments of the present disclosure, the pipeline assembly includes: a first steel pipe; a second steel pipe; a first copper sleeve; and a second copper sleeve, wherein the first copper sleeve is fixed on an end of the first steel pipe and includes a first section sheathing a periphery of the first steel pipe and a second section extending beyond the end of the first steel pipe, the second copper sleeve is fixed on an end of the second steel pipe and sheathes a periphery of the second steel pipe, the second section sheathes at least part of the second copper sleeve by welding.

The pipeline assembly according to embodiments of the present disclosure avoids direct welding between steel materials, thus avoiding requirements for expensive silver-containing solder to reduce the welding cost. In addition, the first copper sleeve and the first steel pipe as well as the second copper sleeve and the second steel pipe may be fixedly connected in advance by adopting a tunnel furnace brazing manner; while the first copper sleeve and the second copper sleeve may be welded with a manual flame during the on-site assembly of the air conditioner, and then, the first copper sleeve and the second copper sleeve may also be fused with the manual flame during the maintenance. Accordingly, on the one hand the pipeline assembly provided by embodiments of the present disclosure realizes replacing steel materials with copper materials for the refrigerant pipe to reduce the cost of the refrigerant pipe; and on the other hand, because the on-site assembly still relates to the welding of copper materials, the welding of the refrigeration pipe is matched with the existing welding equipment and welding process, to improve the adaptability and facilitating the assembly and maintenance of the air conditioning system.

In some embodiments of the present disclosure, the second copper sleeve includes a third section and a fourth section, where a periphery of the third section is sheathed by the second section, and the fourth section is exposed to the outside.

In some embodiments of the present disclosure, the fourth section has a length L1 along an axial direction of the second copper sleeve, wherein 5 mm≤L1≤30 mm.

In some embodiments of the present disclosure, the first steel pipe includes: a first main section; and an expanding section arranged at an end of the first main section and having an inner diameter greater than that of the first main section, wherein a periphery of the expanding section is sheathed by the first section.

In some embodiments of the present disclosure, the expanding section includes a major-diameter section and a first gradient section which is connected between the first main section and the major-diameter section, a periphery of the major-diameter section is sheathed by the first section, the first gradient section has a cross section in a frustum shape along an axial direction of the first steel pipe.

In some embodiments of the present disclosure, the first gradient section has a length L2 of 3 mm or above along the axial direction of the first steel pipe.

In some embodiments of the present disclosure, the second steel pipe includes a second main section; and a shrinking section, arranged at an end of the second main section and having an inner diameter less than that of the second main section, wherein a periphery of the shrinking section is sheathed by the second copper sleeve.

In some embodiments of the present disclosure, the shrinking section includes a minor-diameter section and a second gradient section which is connected between the second main section and the minor-diameter section, a periphery of the minor-diameter section is sheathed by the second copper sleeve, the second gradient section has a cross section in a frustum shape along an axial direction of the second steel pipe.

In some embodiments of the present disclosure, the second gradient section has a length L3 of 3 mm or above along the axial direction of the second steel pipe.

In some embodiments of the present disclosure, the first copper sleeve has a pipe wall thickness t1, and the second copper sleeve has a pipe wall thickness t2, wherein 0.5 mm≤t1≤2 mm, 0.3 mm≤t2≤0.8 mm.

In some embodiments of the present disclosure, the first steel pipe and the second steel pipe are stainless steel pipes, the first copper sleeve and the second copper sleeve are red copper sleeves, the first steel pipe is welded to the first copper sleeve, and the second steel pipe is welded to the second copper sleeve.

The air conditioning system in embodiments of the present disclosure includes a pipeline assembly as described in any one of the above embodiments.

Figure 1:
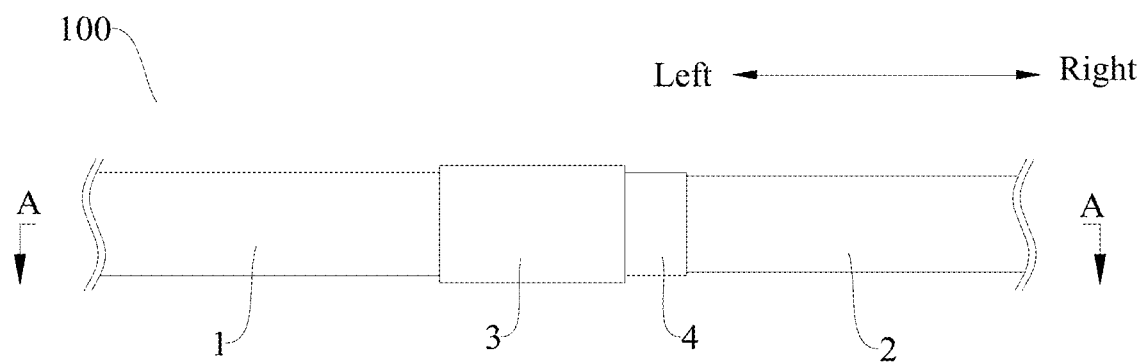
FIG. 1 shows an overall structure of a pipeline assembly according to embodiments of the present disclosure.

DRAWING REFERENCES pipeline assembly 100;

first steel pipe 1; first main section 11; expanding section 12; first gradient section 121; major-diameter section 122;

second steel pipe 2; second main section 21; shrinking section 22; second gradient section 221; minor-diameter section 222;

first copper sleeve 3; first section 31; second section 32;
second copper sleeve 4; third section 41; fourth section 42.

DETAILED DESCRIPTION OF THE DISCLOSURE

Reference will be made in detail to embodiments of the present disclosure. The embodiments described herein with reference to drawings are explanatory, illustrative, and used to generally understand the present disclosure. The embodiments shall not be construed to limit the present disclosure.

Figure 2:
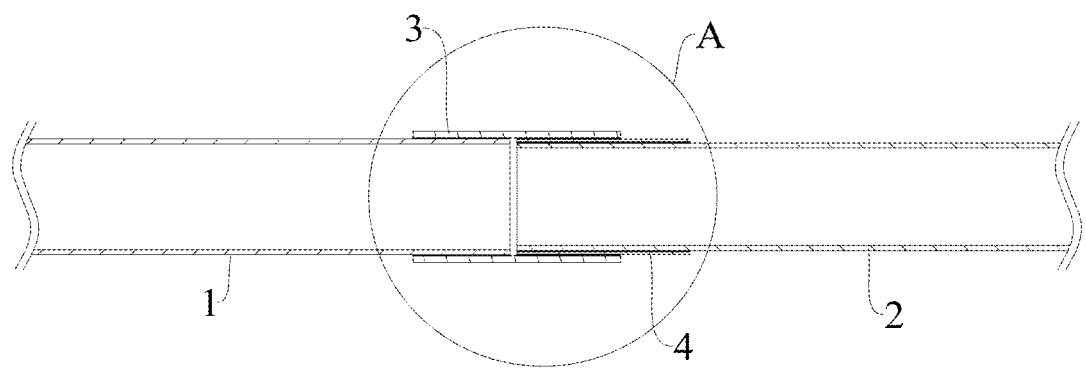
FIG. 2 is a section view along A-A in FIG. 1.
Figure 3:
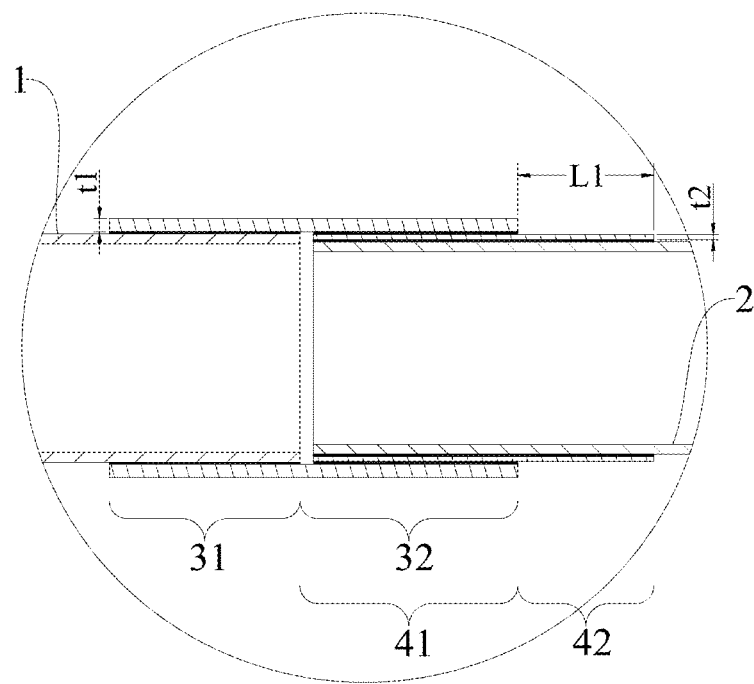
FIG. 3 is a local enlarged drawing of part A in FIG. 2.

As shown in FIGS. 1-3, a pipeline assembly provided in embodiments of the present disclosure includes a first steel pipe 1, a second steel pipe 2, a first copper sleeve 3 and a second copper sleeve 4.

The first copper sleeve 3 is fixed on an end of the first steel pipe 1 and includes a first section 31 sheathing a periphery of the first steel pipe 1 and a second section 32 extending beyond the end of the first steel pipe 1; the second copper sleeve 4 is fixed on an end of the second steel pipe 2 and sheathes a periphery of the second steel pipe 2; and the second section 32 sheathes at least part of the second copper sleeve 4 by welding.

As shown in FIG. 2, the first copper sleeve 3 is fixedly welded to a terminal of one end of the first steel pipe 1. It should be noted that the terminal of the end of the first steel pipe 1 may be seemed as a small section of the end of the first steel pipe 1. The first copper sleeve 3 has an inner diameter greater than an outer diameter of the first steel pipe 1, sheathing a periphery of the first steel pipe 1. Along an axial direction of the first copper sleeve 3, as shown in FIG. 3, the first copper sleeve 3 includes the first section 31 and the second section 32, where the first section 31 sheathes the periphery of the first steel pipe 1 and is fixedly and hermetically welded to the first steel pipe 1, while the second section 32 extends to the outside of the end of the first steel pipe 1.

The second copper sleeve 4 is fixedly welded to a terminal of one end of the second steel pipe 2 and has an inner diameter greater than an outer diameter of the second steel pipe 2, sheathing a periphery of the second steel pipe 2. An outer diameter of the second copper sleeve 4 is less than the inner diameter of the first copper sleeve 3.

When the first steel pipe 1 and the second steel pipe 2 are butted against each other, it merely needs to insert a part of the second copper sleeve 4 into the second section 32 of the first copper sleeve 3 and then hermetically weld the second copper sleeve 4 to the second section 32.

It would be understood that in other embodiments, the first copper sleeve 3 and the second copper sleeve 4 may be screw-fitted with the first steel pipe 1 and the second steel pipe 2, respectively.

The pipeline assembly 100 according to embodiments of the present disclosure avoids direct welding between steel materials, thus avoiding requirements for expensive silver-containing solder to reduce the welding cost. In addition, the first copper sleeve 3 and the first steel pipe 1 as well as the second copper sleeve 4 and the second steel pipe 2 may be fixedly connected in advance by adopting a tunnel furnace brazing manner; while the first copper sleeve 3 and the second copper sleeve 4 may be welded with a manual flame during the on-site assembly of the air conditioner, and then, the first copper sleeve 3 and the second copper sleeve 4 may also be fused with the manual flame during the maintenance. Accordingly, on the one hand the pipeline assembly provided by embodiments of the present disclosure realizes replacing steel materials with copper materials for the refrigerant pipe to reduce the cost of the refrigerant pipe; and on the other hand, as the on-site assembly still relates to the welding of copper materials, the welding of the refrigeration pipe is matched with the existing welding equipment and welding process, to improve the adaptability and facilitating the assembly and maintenance of the air conditioning system.

In some embodiments, the second copper sleeve 4 includes a third section 41 and a fourth section 42, where a periphery of the third section 41 is sheathed by the second section 32, and an expose of the fourth section 42 is exposed to the outside. As shown in FIG. 3, the second copper sleeve 4 along its axial direction includes the third section 41 and the fourth section 42, where the third section 41 is for inserting into and welding to the second section 32 of the first copper sleeve 3, while the fourth section 42 is arranged at the outside of the first copper sleeve 3 welded with the second copper sleeve 4. Arrangement of the fourth section 42 can prevent the second steel pipe 2 from being over-burned during the welding of the first copper sleeve 3 to the second copper sleeve 4, thereby ensuring connection strength among the refrigerant pipes of the air conditioner.

In some embodiments, the fourth section 42 has a length L1 along the axial direction of the second copper sleeve 4, where 5 mm≤L1≤30 mm. As shown in FIG. 3, the fourth section 42 has the length L1 which may be any value between 5 mm to 30 mm. for example, L1 may be 5 mm, 8 mm, 11 mm, 18 mm, 20 mm, 22 mm, 25 mm, 28 mm, 29 mm, 30 mm, etc. The design for the length of the fourth section 42 on the one hand can reduce the material consumption of the second copper sleeve 4, and prevent the second steel pipe 2 from being overheated on the other hand.

Figure 4:
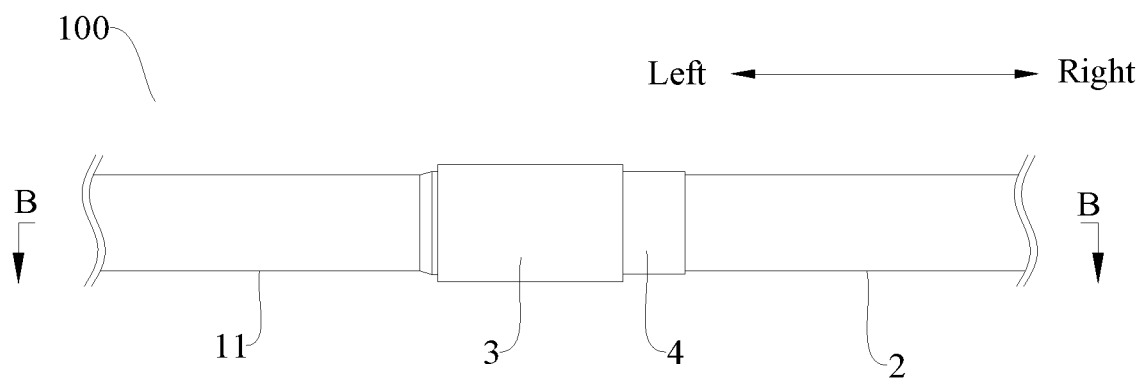
FIG. 4 shows an overall structure of a pipeline assembly according to embodiments of the present disclosure.
Figure 5:
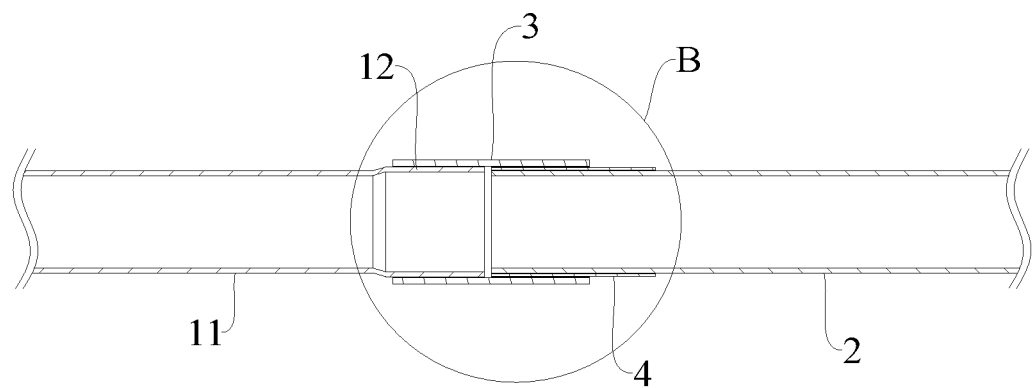
FIG. 5 is a section view along B-B in FIG. 4.

In some embodiments, the first steel pipe 1 includes a first main section 11 and an expanding section 12 which is arranged at an end of the first main section 11 and has an inner diameter greater than that of the first main section 11, where a periphery of the expanding section 12 is sheathed by the first section 31. As shown in FIGS. 4 and 5, the first steel pipe 1 along its axial direction may be divided into the first main section 11 and the expanding section 12, where the first main section 11 is the main body of the first steel pipe 1, while the expanding section 12 is arranged at a terminal of the end of the first main section 11, with the inner diameter greater than that of the first main section 11. Arrangement of the expanding section 12 improves the adaptability between the first steel pipe 1 and the first copper sleeve 3 in the size, without requirements of the first steel pipe 1 with larger radial sizes, which is thereby convenient to adjust the inner diameter of the first main section 11 to be substantially the same as that of the second steel pipe 2.

In some embodiments, the expanding section 12 includes a first gradient section 121 and a major-diameter section 122, where the first gradient section 121 is connected between the first main section 11 and the major-diameter section 122; the first section 31 sheathes a periphery of the major-diameter section 122; and the first gradient section 121 has a cross section in a frustum shape along an axial direction of the first steel pipe 1.

Figure 6:
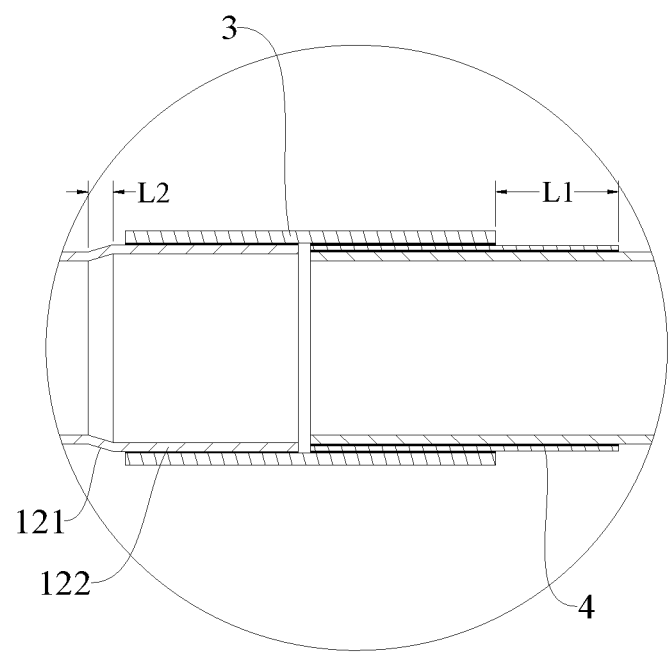
FIG. 6 is a local enlarged drawing of part B in FIG. 5.

As shown in FIG. 6, the first gradient section 121 is arranged between the first main section 11 and the major-diameter section 122, where the first gradient section 121 is of a frustum shape substantially and the major-diameter section 122 is a straight pipe, and the first gradient section 121 provides a size transition between the first main section 11 and the major-diameter section 122. The major-diameter section 122 having a consistent outer diameter facilitates the welding and assembly with the first copper sleeve 3.

In some embodiments, the first gradient section 121 has a length L2 which is 3 mm or above along the axial direction of the first steel pipe 1. For example, L2 may be 3 mm, 4 mm, 5 mm, 6 mm, 7 mm, 8 mm, etc. The first gradient section 121 with above sizes is conducive to improving its structural strength.

In some embodiments, the second steel pipe 2 includes: a second main section 21 and a shrinking section 22, where the shrinking section 22 is arranged at an end of the second main section 21 and has an inner diameter less than that of the second main section 21, and a periphery of the shrinking section 22 is sheathed by the second copper sleeve 4.

Figure 7:
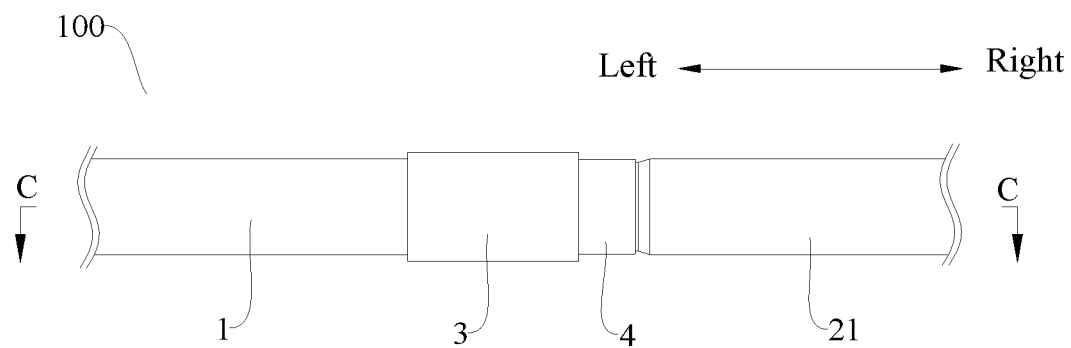
FIG. 7 shows an overall structure of a pipeline assembly according to embodiments of the present disclosure.
Figure 8:
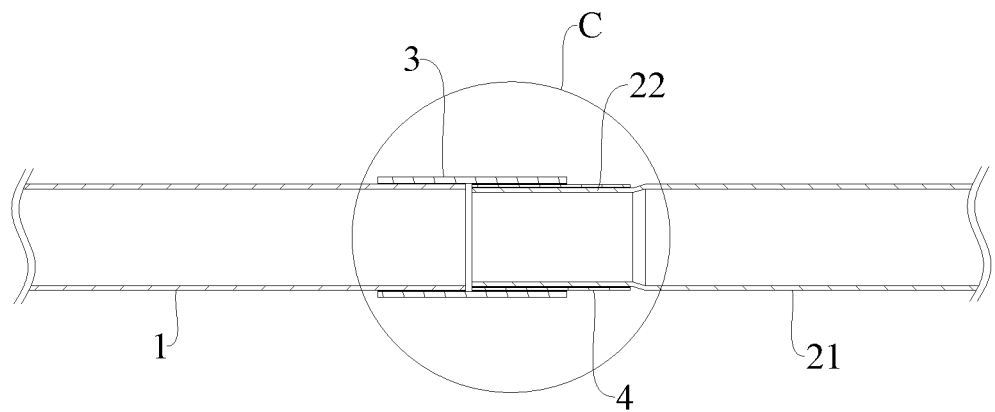
FIG. 8 is a section view along C-C in FIG. 7.

As shown in FIGS. 7 and 8, the second steel pipe 2 along its axial direction may be divided into the second main section 21 and the shrinking section 22, where the second main section 21 is the main body of the second steel pipe 2, while the shrinking section 22 is arranged at a terminal of the end of the second main section 21, with the inner diameter less than that of the second main section 21. Arrangement of the shrinking section 22 improves the adaptability between the second steel pipe 2 and the second copper sleeve 4 in the size, without requirements of the second steel pipe 2 with smaller radial sizes, which is thereby convenient to adjust the inner diameter of the second main section 21 to be substantially the same as that of the first steel pipe 1.

In some embodiments, the shrinking section 22 includes a second gradient section 221 and a minor-diameter section 222, where the second gradient section 221 is connected between the second main section 21 and the minor-diameter section 222; a periphery of the minor-diameter section 222 is sheathed by the second copper sleeve 4; and the second gradient section 221 has a cross section in a frustum shape along an axial direction of the second steel pipe 2.

Figure 9:
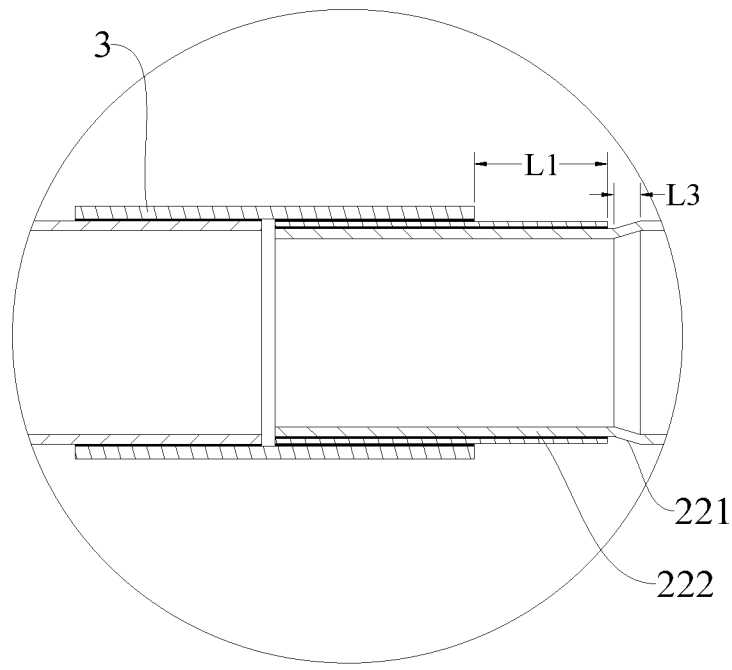
FIG. 9 is a local enlarged drawing of part C in FIG. 8.

As shown in FIG. 9, the second gradient section 221 is arranged between the second main section 21 and the minor-diameter section 222, where the second gradient section 221 is of a frustum shape substantially and the minor-diameter section 222 is a straight pipe, and the second gradient section 221 provides a size transition between the second main section 21 and the minor-diameter section 222. The minor-diameter section 222 having a consistent outer diameter facilitates the welding and assembly with the second copper sleeve 4.

In some embodiments, the second gradient section 221 has a length L3 which is 3 mm or above along the axial direction of the second steel pipe 2. For example, L3 may be 3 mm, 4 mm, 5 mm, 6 mm, 7 mm, 8 mm, etc. The second gradient section 221 with above sizes is conducive to improving its structural strength.

In some embodiments, the first copper sleeve 3 has a pipe wall thickness t1, and the second copper sleeve 4 has a pipe wall thickness t2, where 0.5 mm≤t1≤2 mm, 0.3 mm≤t2≤ 0.8 mm.

As shown in FIG. 3, the pipe wall thickness t1 may be any value between 0.5 mm to 2 mm. For example, the pipe wall thickness t1 may be 0.5 mm, 0.8 mm, 1.0 mm, 1.2 mm, 1.5 mm, 1.7 mm, 1.9 mm, 2.0 mm, etc. The pipe wall thickness t2 may be any value between 0.3 mm and 0.8 mm. For example, the pipe wall thickness t2 may be 0.3 mm, 0.4 mm, 0.5 mm, 0.6 mm, 0.7 mm, 0.8 mm, etc.

Thus, it not only ensures the structural strength of the first copper sleeve 3 and the second copper sleeve 4, but also facilitates the size matching of the two.

In some embodiments, the first steel pipe 1 and the second steel pipe 2 are both stainless steel pipes, and the first copper sleeve 3 and the second copper sleeve 4 are both red copper sleeves, where the first steel pipe 1 is welded to the first copper sleeve 3 while the second steel pipe 2 is welded to the second copper sleeve 4. The first copper sleeve and the first steel pipe, as well as the second copper sleeve and the second steel pipe, may be welded by adopting a tunnel furnace brazing manner. As the welding temperature of the tunnel furnace brazing is lower than that of the manual flame welding, the welding of the first copper sleeve 3 to the second copper sleeve 4 by the manual flame is of low influence on the welding strengths between the first steel pipe 1 and the first copper sleeve 3 as well as between the second steel pipe 2 and the second copper sleeve 4.

In some embodiments, the first steel pipe 1 may be a straight pipe or bent pipe, and the second steel pipe 2 may be a straight pipe or bent pipe.

An air conditioning system according to embodiments of the present disclosure is described below.

The air conditioning system according to embodiments of the present disclosure includes a pipeline assembly, which may be a pipeline assembly 100 as described in the above embodiments. The air conditioning system includes a compressor, an evaporator, a condenser, etc. The pipeline assembly 100 may be connected between the compressor and the evaporator, or between the compressor and the condenser.

The air conditioning system according to embodiments of the present disclosure includes the pipeline assembly 100 which is of low cost and high adaptability to the existing welding equipment and welding process.

In the specification, it should be understood that, the terms indicating orientation or position relationship such as "central", "longitudinal", "lateral", "length", "width", "thickness", "above", "below", "front", "rear", "right", "left", "vertical", "horizontal", "top", "bottom", "inner", "outer", "clockwise", "counter-clockwise", "axial", "radial", "circumferential" should be construed to refer to the orientation or position relationship as then described or as shown in the drawings. These terms are merely for convenience and concision of description and do not alone indicate or imply that the device or element referred to must have a particular orientation or must be configured or operated in a particular orientation. Thus, it cannot be understood to limit the present disclosure.

In addition, terms such as "first" and "second" are used herein for purposes of description and are not intended to indicate or imply relative importance or significance or impliedly indicate quantity of the feature referred to. Thus, the feature defined with "first" and "second" may include one or more this feature. In the description of the present disclosure, "a plurality of" means two or more than two this features, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections, or be intercommunicated; may also be direct connections or indirect connections via intervening structures; may also be inner communications of two elements.

In the present disclosure, unless specified or limited otherwise, a structure in which a first feature is "on" or "below" a second feature may be an embodiment in which the first feature is in direct contact with the second feature, or an embodiment in which the first feature and the second feature are contacted indirectly via an intermediation. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples", in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A pipeline assembly, comprising:
a first steel pipe;
a second steel pipe;
a first copper sleeve; and
a second copper sleeve,
wherein the first copper sleeve is fixed on an end of the first steel pipe and comprises a first section sheathing a periphery of the first steel pipe and a second section extending beyond the end of the first steel pipe, the second copper sleeve is fixed on an end of the second steel pipe and sheathes a periphery of the second steel pipe, the second section sheathes at least part of the second copper sleeve by welding;
wherein the second copper sleeve comprises a third section and a fourth section, wherein a periphery of the third section is sheathed by the second section, and the fourth section is exposed to an outside;
wherein the fourth section has a length L1 along an axial direction of the second copper sleeve, wherein 5 mm≤L1≤30 mm;

wherein the first copper sleeve has a pipe wall thickness t1, the second copper sleeve has a pipe wall thickness t2, 1 mm≤t1≤2 mm, 0.3 mm≤t2≤0.8 mm, and the pipe wall thickness t1 is larger than the pipe wall thickness t2.

2. The pipeline assembly according to claim 1, wherein the first steel pipe comprises: a first main section; and an expanding section, arranged at an end of the first main section and having an inner diameter greater than that of the first main section, wherein a periphery of the expanding section is sheathed by the first section.

3. The pipeline assembly according to claim 2, wherein the expanding section comprises a major-diameter section and a first gradient section, the first gradient section is connected between the first main section and the major-diameter section, a periphery of the major-diameter section is sheathed by the first section, the first gradient section has a cross section in a frustum shape along an axial direction of the first steel pipe.

4. The pipeline assembly according to claim 3, wherein the first gradient section has a length L2 of 3 mm or above along the axial direction of the first steel pipe.

5. The pipeline assembly according to claim 1, wherein the second steel pipe comprises: a second main section; and a shrinking section, arranged at an end of the second main section and having an inner diameter less than that of the second main section, wherein a periphery of the shrinking section is sheathed by the second copper sleeve.

6. The pipeline assembly according to claim 5, wherein the shrinking section comprises a minor-diameter section and a second gradient section, the second gradient section is connected between the second main section and the minor-diameter section, a periphery of the minor-diameter section is sheathed by the second copper sleeve, the second gradient section has a cross section in a frustum shape along an axial direction of the second steel pipe.

7. The pipeline assembly according to claim 6, wherein the second gradient section has a length L3 of 3 mm or above along the axial direction of the second steel pipe.

8. The pipeline assembly according to claim 1, wherein the first steel pipe and the second steel pipe are stainless steel pipes, the first steel pipe is welded to the first copper sleeve, the second steel pipe is welded to the second copper sleeve.

9. The pipeline assembly according to claim 1, wherein there is an axial clearance between the end of the first steel pipe and the end of the second steel pipe.

10. An air conditioning system, comprising;
a pipeline assembly, comprising:
a first steel pipe;
a second steel pipe;
a first copper sleeve; and
a second copper sleeve,
wherein the first copper sleeve is fixed on an end of the first steel pipe and comprises a first section sheathing a periphery of the first steel pipe and a second section extending beyond the end of the first steel pipe, the second copper sleeve is fixed on an end of the second steel pipe and sheathes a periphery of the second steel pipe, the second section sheathes at least part of the second copper sleeve by welding;
wherein the second copper sleeve comprises a third section and a fourth section, wherein a periphery of the third section is sheathed by the second section, and the fourth section is exposed to an outside;
wherein the fourth section has a length L1 along an axial direction of the second copper sleeve, wherein 5 mm≤L1≤30 mm;

wherein the first copper sleeve has a pipe wall thickness t1, the second copper sleeve has a pipe wall thickness t2, 1 mm≤t1≤2 mm, 0.3 mm≤t2≤0.8 mm, and the pipe wall thickness t1 is larger than the pipe wall thickness t2.

11. The air conditioning system according to claim 10, wherein the first steel pipe comprises: a first main section; and an expanding section, arranged at an end of the first main section and having an inner diameter greater than that of the first main section, wherein a periphery of the expanding section is sheathed by the first section.

12. The air conditioning system according to claim 11, wherein the expanding section comprises a major-diameter section and a first gradient section, the first gradient section is connected between the first main section and the major-diameter section, a periphery of the major-diameter section is sheathed by the first section, the first gradient section has a cross section in a frustum shape along an axial direction of the first steel pipe.

13. The air conditioning system according to claim 12, wherein the first gradient section has a length L2 of 3 mm or above along the axial direction of the first steel pipe.

14. The air conditioning system according to claim 10, wherein the second steel pipe comprises: a second main section; and a shrinking section, arranged at an end of the second main section and having an inner diameter less than that of the second main section, wherein a periphery of the shrinking section is sheathed by the second copper sleeve.

15. The air conditioning system according to claim 14, wherein the shrinking section comprises a minor-diameter section and a second gradient section, the second gradient section is connected between the second main section and the minor-diameter section, a periphery of the minor-diameter section is sheathed by the second copper sleeve, the second gradient section has a cross section in a frustum shape along an axial direction of the second steel pipe.

16. The air conditioning system according to claim 15, wherein the second gradient section has a length L3 of 3 mm or above along the axial direction of the second steel pipe.

17. The air conditioning system according to claim 10, wherein there is an axial clearance between the end of the first steel pipe and the end of the second steel pipe.

* * * * *